United States Patent [19]

Kawashita et al.

[11] Patent Number: 5,183,501

[45] Date of Patent: Feb. 2, 1993

[54] INK COMPOSITIONS FOR INK JET RECORDING

[75] Inventors: Hideo Kawashita; Mituhiro Ohta; Kazuya Ogino, all of Osaka, Japan

[73] Assignees: Sumitomo Chemical Company, Limited; Taoka Chemical Co. Ltd., both of Osaka, Japan

[21] Appl. No.: 775,029

[22] Filed: Oct. 11, 1991

[30] Foreign Application Priority Data

Oct. 17, 1990 [JP] Japan .................................. 2-279586
Mar. 13, 1991 [JP] Japan .................................... 3-74584

[51] Int. Cl.$^5$ ............................................ C09D 11/02
[52] U.S. Cl. .................................. 106/22 D; 534/751; 534/796; 534/797; 534/841; 534/842; 106/22 K; 106/22 H
[58] Field of Search .................. 106/22; 534/751, 796, 534/797, 841, 842

[56] References Cited

U.S. PATENT DOCUMENTS

| | | | |
|---|---|---|---|
| 4,585,460 | 4/1986 | Schwander et al. | 534/751 |
| 4,592,756 | 6/1986 | Kawasaki et al. | 106/22 |
| 4,849,770 | 7/1989 | Koike et al. | 106/22 |
| 4,861,344 | 8/1989 | Schläfer et al. | 534/751 |
| 5,011,917 | 4/1991 | Opitz et al. | 8/549 |

FOREIGN PATENT DOCUMENTS 0312004 4/1989 European Pat. Off. .
2514856 10/1976 Fed. Rep. of Germany .
2184742 7/1987 United Kingdom .

OTHER PUBLICATIONS

111 Chemical Abstracts 216123a (1989).
86 Chemical Abstracts 18360c (1977).

Primary Examiner—Shrive Beck
Assistant Examiner—Helene Klemanski

[57] ABSTRACT

An ink composition for ink jet recording, which contains a water-soluble dye, an organic solvent and water, in which the dye is represented by the formula (1) as shown in the state of free acid:

$$D-(SO_2CH_2CH_2SO_3H)_m \quad (1)$$

wherein D represents a dye residue selected from the group of monoazo and polyazo dyes, their complexes with Cr, Fe, Co and Cu, copper and nickel phthalocyanine dyes, anthraquinone dyes, dioxazine dyes, and formazane complex dyes, and m represents an integer of 1, 2, 3 or 4, and which is superior in its stability during preservation and while being used, thermal stability, image clearness, water resistivity, light fastness, etc.

7 Claims, No Drawings

INK COMPOSITIONS FOR INK JET RECORDING

FIELD OF THE INVENTION

The present invention relates to an ink composition for ink jet recording.

BACKGROUND OF THE INVENTION

A water-based ink composition useful for ink jet recording usually comprises dyes, organic solvents and water. In order to obtain good ink jet recording, the ink composition is required to meet various needs.

For example, physical properties of the ink composition such as viscosity, surface tension, specific electric conductivity, density and pH are to be adequately controlled within a desired range so as to apply the composition for any means of generating ink droplets and controlling the flying direction of the ink droplets.

Moreover, these physical properties are required to be kept unchangeable for a long period of time. For example, the ink composition must not produce precipitates due to chemical changes or the like during extended storage or use or at the rest time of recording operation. When produced, the precipitates easily clog a jet nozzle of an ink jet recording apparatus which has a diameter as small as 10–60 μm. This interrupts the jetting of ink droplets. Even when the composition produces no precipitate, but solid or cohesive matters, they easily adhere to the nozzle which adversely affects the recording ability, jetting stability, and jetting response.

Further, high heat resistance is also required particularly for a thermal energy-utilizing ink jet system which has been developed recently.

In addition, it is desired that recorded images are sufficiently high in the degree of contrast and clearness and excellent in water resistance and light fastness.

As dyes for ink jet recording, heretofore, direct, acid and reactive dyes have been used. For example, C. I. Direct Black 17, 19, 22, 32, 51, 56, 62, 71, 74, 75, 77, 94, 105, 106, 107, 108, 112, 113, 117, 118, 122, 132, 133, 146, 154, 159, 162, 168, 169 and 173; C. I. Direct Blue 86, 87 and 199; C. I. Direct Red 9; C. I. Direct Yellow 86, 142 and 144; C. I. Acid Yellow 23, 42 and 49; C. I.. Acid Red 14, 34, 35, 37 and 249; C. I. Acid Blue 7, 9 and 249; C. I. Reactive Red 24, 35, 111, 114, 174, 180 and 184; C. I. Food Black 2, etc. are illustrated.

In the Japanese Patent (Laid-Open) Publication No. 123,866/1989, azo dyes having a substituent group of —SO₂CH₂CH₂OH or —SO₂CH=CH₂ have been used for ink jet recording inks.

However, use in an red dyes heretofore used are not yet satisfactory for the ink jet recording ink.

The present inventors have undertaken extensive studies to find ink compositions meeting the needs described above and useful for ink jet recording, and as a result have attained the present invention.

SUMMARY OF THE INVENTION

The present invention provides an ink composition for ink jet recording, which is characterized by containing a water-soluble dye, an organic solvent and water, said dye being represented by the following formula (1) as shown in the state of free acid:

D—(SO₂CH₂CH₂SO₃H)<sub>m</sub>  (1)

wherein D represents a dye residue selected from the group of monoazo and polyazo dyes, their complexes with Cr, Fe, Co and Cu, copper and nickel phthalocyanine dyes, anthraquinone dyes, dioxazine dyes and formazane complex dyes, and m represents an integer of 1, 2, 3 or 4.

Salts of the dyes represented by the above formula (1) which show in the state of free acid, can be illustrative. Such salts include salts of alkali metals such as sodium and potassium, ammonium salts, organic ammonium salts such as of ethanolamine and propanolamine, and the like.

DETAILED DESCRIPTION OF THE INVENTION

The water-soluble dyes of the formula (1) can readily be produced by treating a reactive dye represented by the formula (2) or (3) in the free acid form:

D—(SO₂CH₂CH₂OSO₃H)<sub>m</sub>  (2)

D—(SO₂CH=CH₂)<sub>m</sub>  (3)

(wherein D and m are as defined above), at an elevated temperature with a sulfite salt such as sodium sulfite, if desired, in the presence of an alkali (for example, sodium carbonate, sodium bicarbonate, sodium hydroxide, etc.).

Furthermore, the water-soluble dyes of the formula (1) can be obtained by a conventional dye synthesis method using reactive dye intermediates which have the group represented by the formula (4):

—SO₂CH₂CH₂SO₃H  (4)

Examples of the dyes of the formula (1) are those obtained by treating the following known reactive dyes in the manner described above: C. I. Reactive Yellow 13, 14, 15, 16, 17, 23, 24, 37, 42, 75, 76, 77, 79, 114, 115 and 116; C. I. Reactive Orange 7, 15, 16, 23, 24, 56, 72 and 113; C. I. Reactive Red 21, 22, 33, 34, 35, 36, 49, 50, 63, 64, 106, 108, 109, 110, 111, 112, 113, 114, 129 and 180; C. I. Reactive Violet 22; C. I. Reactive Brown 21; C. I. Reactive Blue 19, 20, 21, 27, 28, 37, 38, 77, 100, 101, 123, 147 and 148; C. I. Reactive Black 5 and 14, which are all represented by the formula (2) or (3), and those described in Japanese Patent Kokai (Laid-Open) No. 51-122128.

The dyes of the formula (1) also include dyes represented by the formula (5) in the free acid form:

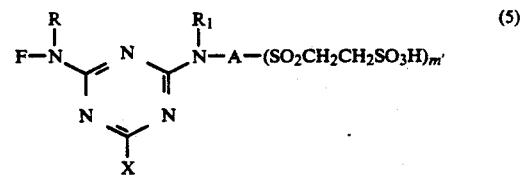

(5)

wherein F represents a dye residue selected from the group of monoazo and polyazo dyes, their complexes with Cr, Fe, Co and Cu, copper and nickel phthalocyanine dyes, anthraquinone dyes, dioxazine dyes and formazane complex dyes; R and R₁ independently represent a hydrogen atom or methyl or ethyl group; A represents an alkylene or alkyleneoxy group, or a phenylene or naphthylene group which may be substituted with a lower alkyl, lower alkoxy or sulfonic acid group;

X represents a chlorine or fluorine atom or a group of —NR$_2$R$_3$ or —OR$_4$; R$_2$, R$_3$ and R$_4$ independently represent a hydrogen atom or a phenyl or naphthyl group which may be substituted; and m' represents an integer of 1 or 2.

These dyes can readily be produced by treating dyes represented by the formula (6) in the free acid form:

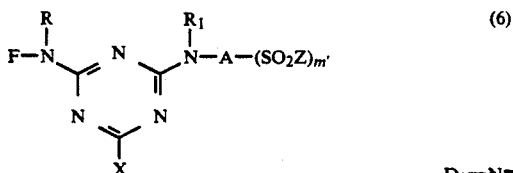
(6)

(wherein F, R, R$_1$, A, X and m' are as defined above, and Z represents a group of —CH$_2$CH$_2$OSO$_3$H or —CH=CH$_2$), at an elevated temperature with a sulfite salt such as sodium sulfite, if desired, in the presence of an alkali (for example, sodium carbonate, sodium bicarbonate, sodium hydroxide, etc.).

For the compounds represented by F-NRH which are starting materials for the water-soluble dyes represented by the formula (5) mentioned above, there are exemplified the following groups.

(I) anthraquinone compounds represented by the formula (7):

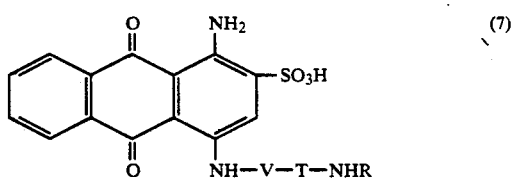
(7)

wherein R is as defined above; T is a direct linkage or an aliphatic, alicylic or aromatic bridging group; the anthraquinone nucleus may have one or more additional sulfonic acid groups at the 5-, 6-, 7- or 8-position; and V represents a benzenoid bivalent group such as phenylene, diphenylene or 4,4'-bivalent stilbene group, or a bridging group such as azobenzene, each of the benzene nuclei preferably having a sulfonic acid group.

(II) Monoazo compounds represented by the formula (8):

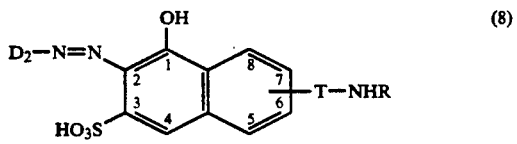
(8)

wherein T and R are as defined above; D$_2$ represents a monocyclic or dicyclic aryl group; the —T—NHR group links specifically to the 6-, 7- or 8-position of the naphthalene nucleus which may have a sulfonic acid group at the 5- or 6-position; D$_2$ represents a naphthalene or benzene group, for example, stilbene, diphenyl, benzothiazolyl/phenyl, or diphenylamine group; a benzoylamino or anilino group may be linked to the 6-, 7-, or 8-position of the naphthalene nucleus in place of the —NHR group; more advantageously, D$_2$ represents a sulfonated phenyl or naphthyl group, particularly, such group having a —SO$_3$H group at the ortho-position against the azo linkage; and the benzene nucleus may further be substituted with a halogen atom such as a chlorine atom, an alkyl group such as methyl group, an acylamino group such as acetylamino group, or an alkoxy group such as methoxy group.

(III) Polyazo compounds represented by the formula (9):

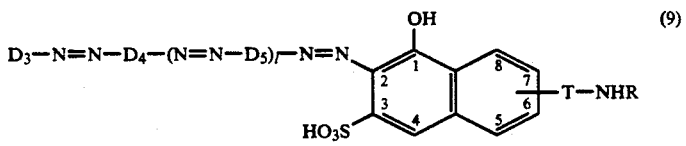
(9)

wherein T and R are as defined above; the —T—NHR group specifically links to the 6-, 7- or 8-position of the naphthalene nucleus which may have a sulfonic acid group at the 5- or 6-position; D$_3$ represents a phenyl or naphthyl group which may have one or more substituents; D$_4$ and D$_5$ represent independently a phenylene or naphthylene group which may have one or more substituents; l is 0 or 1; and, preferably, the groups represented by D$_3$, D$_4$ and D$_5$ have 1-3 sulfonic acid groups in total.

(IV) Monoazo or disazo compounds represented by the formula (10):

(10)

wherein T and R are as defined above; D$_2$ represents a group as defined in the item (II), or a group of D$_3$—N=N—D$_4$—(N=N—D$_5$)$_l$ as defined in the item (III) (provided that l=0); D$_6$ represents a 1,4-phenylene, sulfo-1,4-naphthylene, or stilbene group; and the benzene nucleus of D$_2$ and D$_6$ may further have one or more substituents, for example a halogen atom or an alkyl, alkoxy, carboxy or acylamino group.

(V) Monozo or disazo compounds represented by the formula (11):

(11)

wherein T and R are as defined above; D$_7$ represents an azoarylene group, for example, a group of azobenzene, azonaphthalene, or phenylazonaphthalene, or an at most dicyclic arylene group of benzene or naphthalene; K represents a naphtholsulfonic acid group or an enolized or enolizable ketomethylene compound having a hydroxyl group at the α-position against the azo group (for example, acetoacetarylide, 5-pyrazolone, or 6-hydroxypyrid-2-one); and the benzene nucleus in D$_7$ may have one or more sulfonic acid group.

(VI) Monoazo or disazo compounds represented by the formula (12):

(12)

wherein T and R are as defined above; $D_2$ represents a group as defined in the item (II), or a group of $D_3-N=N-D_4-(N=N-D_5)_l-$ as defined in the item (III) (provided that l=0); and $K_2$ represents a group of an enolizable ketomethylene compound having a hydroxyl group at α-position against the azo group (for example, acetoacetarylide or 5-pyrazolone).

(VII) Metal-containing azo compounds:

The compounds are 1:1 metal complex, particularly preferably, copper complex, derived from a compound having metallizable groups (for example, hydroxy, lower alkoxy or carboxy group) at the ortho-position against the azo group in $D_2$ or $D_7$, in the compounds represented by the formula (8), (11) and (12).

(VIII) Phthalocyanine compounds represented by the formula (13):

(13)

wherein R is as defined above; Pc represents a phthalocyanine nucleus, particularly, copper phthalocyanine; u represents a hydroxyl group and/or a substituted or unsubstituted amino group; $V_1$ represents a bridging group, particularly, an aliphatic, alicyclic or aromatic bridging group; and $n_1$ represents 1, 2 or 3.

(IX) Formazane dyes represented by the formula (14):

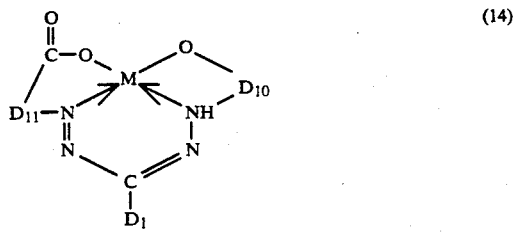
(14)

wherein M means copper or nickel; $D_{10}$ and $D_{11}$ are respectively an arylene group of one or more nuclei, linked at the ortho-carbon atoms; $D_1$ represents an aliphatic, alicyclic, or aromatic hydrocarbon group; and at least one of $D_1$, $D_{10}$ and $D_{11}$ has a group of $-NR-H$ or $-T-NRH$ (in which T and R are as defined above).

(X) Triphendioxazine dyes represented by the formula (15):

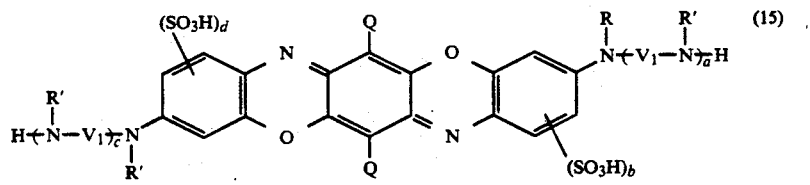
(15)

wherein R and $V_1$ are as defined above; Q means a chlorine or bromine atom; R' represents a hydrogen atom or a lower alkyl group which may have one or more substituents; a and c are independently 0 or 1; and b and d are independently 1 or 2.

As the embodiments of the compounds in the items (I) to (X), the followings are illustrated.

Item (I):

1-amino-4-(4'-aminoanilino)anthraquinone-2,2'-disulfonic acid, 1-amino-4-(4'-methylaminoanilino)anthraquinone-2,3'-disulfonic acid, 1-amino-4-(3'-amino-2',4',6'-trimethylanilino)anthraquinone-2,5'-disulfonic acid, 1-amino-4-)4'-aminoacetylaminoanilino) anthraquinone-2,2'-disulfonic acid, and 1-amino-4-(3'-aminoanilino)anthraquinone-2,4'-disulfonic acid.

Item (II):

6-amino-1-hydroxy-2-(2'-sulfophenylazo)naphthalene-3-sulfonic acid, 8-amino-1-hydroxy-2-(2'-sulfophenylazo)naphthalene-3,6-disulfonic acid, 7-amino-2-(2', 5'-disulfophenylazo)-1-hydroxynaphthalene-3-sulfonic acid, 7-methylamino-2-(2'-sulfophenylazo)-1-hydroxynaphthalene-3-sulfonic acid, 7-methylamino-2-(4'-methoxy-2'-sulfophenylazo)-1-hydroxynaphthalene-3-sulfonic acid, 8-(3'-aminobenzoylamino)-1-hydroxy-2-(2'-sulfophenylazo)naphthalene-3,6-disulfonic acid, 8-amino-1-hydroxy-2,2'-azonaphthalene-1', 3,5', 6-tetrasulfonic acid, 6-amino-1-hydroxy-2-(4'-acetylamino-2'-sulfophenylazo)naphthalene-3-sulfonic acid, 6-methylamino-1-hydroxy-2-(4'-methoxy-2'-sulfophenylazo)naphthalene-3-sulfonic acid, 8-amino-1-hydroxy-2-phenylazonaphthalene-3,6-disulfonic acid, 8-amino-1-hydroxy-2,2'-azonaphthalene-1', 3,6-trisulfonic acid, 6-amino-1-hydroxy-2-(4'-methoxy-2-sulfophenylazo)-naphthalene-3-sulfonic acid, 8-amino-1-hydroxy-2,2'-azonaphthalene-1', 3,5'-trisulfonic acid, 6-amino-1-hydroxy-2,2'-azonaphthalene-1', 3, 5'-trisulfonic acid, 6-methylamino-1-hydroxy-2,2'-azonaphthalene-1', 3-disulfonic acid, 7-amino-1-hydroxy-2,2'-azonaphthalene-1', 3-disulfonic acid, 8-amino-1-hydroxy-2-(4'-hydroxy-3'-carboxyphenylazo)naphthalene-3,6-disulfonic acid, 6-amino-1-hydroxy-2-(4'-hydroxy-3'-carboxyphenylazo)naphthalene-3,5-disulfonic acid, 1-hydroxy-2-(1'-sulfonaphtho-2'-ylazo)-8-ω-(N-butylamino)propionylaminonaphthalene-3,6-disulfonic acid, 1-hydroxy-2-(1'-sulfonaphtho-2'-ylazo)-8-ω-(N-methylamino)acetylaminonaphthalene-3,5-disulfonic acid, 1-hydroxy-2-(1'-sulfonaphtho-2'-ylazo)-8-ω-(N-methylamino)acetylaminonaphthalene-3,6-disulfonic acid, 1-hydroxy-2-(2'-sulfophenylazo)-8-ω-(N-methylamino)acetylaminonaphthalene-3,6-disulfonic acid, 1-hydroxy-2-phenylazo-8-ω-(N-methylamino)acetylaminonaphthalene-3,6-disulfonic acid,
1-hydroxy-2-(4'-methoxy-2'-sulfophenylazo)-8-ω-(N-methylamino)acetylaminonaphthalene-3,6-disulfonic acid,
1-hydroxy-2-(2'-sulfophenylazo)-8-ω-(N-methylamino)acetylaminonaphthalene-3,6-disulfonic acid,
1-hydroxy-2-(1'-sulfonaphtho-2'-ylazo)-8-ω-aminoacetylaminonaphthalene-3,6-disulfonic acid,
1-hydroxy-2-(1'-sulfonaphtho-2'-ylazo)-8-ω-aminopropylaminonaphthalene-3,6-disulfonic acid,
1-hydroxy-2-(1'-sulfonaphtho-2'-ylazo)-6-ω-(N-methylamino)acetylaminonaphthalene-3-sulfonic acid,
1-hydroxy-2-(1'-sulfonaphtho-2'-ylazo)-6-ω-(N'-methylamino)acetyl-N-methylaminonaphthalene-3-sulfonic acid,
1-hydroxy-2-(1'-sulfonaphtho-2'-ylazo)-7-ω-(N-methylamino)acetylaminonaphthalene-3-sulfonic acid,
1-hydroxy-2-(1'-sulfonaphtho-2'-ylazo)-8-ω-(N-propylamino)acetylaminonaphthalene-3,6-disulfonic acid,
1-hydroxy-2-(1'-sulfonaphtho-2'-ylazo)-8-ω-(N-butylamino)acetylaminonaphthalene-3,6-disulfonic acid, and
1-hydroxy-2-(1'-sulfonaphtho-2'-ylazo)-8-ω-(N-benzylamino)acetylaminonaphthalene-3,6-disulfonic acid.

Item (III):
8-amino-1-hydroxy-2-[4'-(2''-sulfophenylazo)-2'-methoxy-5'-methylphenylazo]naphthalene-3,6-disulfonic acid,
4,4'-bis(8''-amino-1''-hydroxy-3'', 6''-disulfo-2''-naphthylazo)-3,3'-dimethoxydiphenyl,
6-amino-1-hydroxy-2-[4'-(2''-sulfophenylazo)-2'-methoxy-5'-methylphenylazo]naphthalene-3,5-disulfonic acid,
8-ω-(N-methylamino)acetylamino-1-hydroxy-2-[4'-(2''-sulfophenylazo)-2'-methoxy-5'-methylphenylazo]-naphthalene-3,6-disulfonic acid, and
4,4'-bis[8''-ω-(N-methylamino)acetylamino-1''-hydroxy-3'', 6''-disulfonaphtho-2''-ylazo]-3,3'-dimethoxy-diphenyl.

Item (IV):
2-(4'-amino-2'-methylphenylazo)naphthalene-4,8-disulfonic acid,
2-(4'-amino-2'-acetylaminophenylazo)-naphthalene-5,7-disulfonic acid,
2-(4'-amino-2'-ureidophenylazo)naphthalene-3,6,8-trisulfonic acid,
4-nitro-4'-(4''-methylaminophenylazo)-stilbene-2,2'-disulfonic acid,
4-nitro-4'-(4''-amino-2''-methyl-5''-ω-methoxyphenylazo)stilbene-2,2'-disulfonic acid,
2-(4'-amino-2'-acetylaminophenylazo)-naphthalene-4,8-disulfonic acid,
4-amino-2-methylazobenzene-2'-sulfonic acid,
4-[4'-(2'', 5''-disulfophenylazo)-2', 5'-dimethylphenylazo]-1-naphthylamine-8-sulfonic acid,
4-[4'-(2'', 5'', 7''-trisulfonaphtho-1''-ylazo)-2', 5'-dimethylphenylazo]-1-naphthylamine-6-sulfonic acid,
2-(4'-methylaminoacetylamino-2'-ureidophenylazo)-naphthalene-3,6,8-trisulfonic acid,
4-[4'-(2'', 5'', 7''-trisulfonaphtho-1''-ylazo)-2', 5'-dimethylphenylazo]-1-naphthylamine-7-sulfonic acid,
4-[4'-(2'', 5'', 7''-trisulfonaphtho-1''-ylazo)-naphth-1'-ylazo]-1-naphthylamine-6-sulfonic acid,
4-[4'-(2'', 5''-disulfophenylazo)-6'-sulfonaphtho-1'-ylazo]-1-naphthylamine-8-sulfonic acid,
4-[4'-(4''-sulfophenylazo)-2'-sulfophenylazo]-1-naphthylamine-6-sulfonic acid.

Item (V):
1-(2', 5'-dichloro-4'-sulfophenyl)-3-methyl-4-(3''-amino-4''-sulfophenylazo)-5-pyrazolone,
1-(4'-sulfophenyl)-3-carboxy-4-(4''-amino-3''-sulfophenylazo)-5-pyrazolone,
1-(2'-methyl-5'-sulfophenyl)-3-methyl-4-(4''-amino-3''-sulfophenylazo)-5-pyrazolone,
1-(2'-sulfophenyl)-3-methyl-4-(3''-amino-4''-sulfophenylazo)-5-pyrazolone,
4-amino-4'-(3''-methyl-5''-oxo-1''-phenylpyrazolin-4''-ylazo)stilbene-2,2'-disulfonic acid,
4-amino-4'-(2''-hydroxy-3'', 6''-disulfo-1''-naphthylazo)-stilbene-2,2'-disulfonic acid,
8-acetylamino-1-hydroxy-2-(3'-amino-2'-sulfophenylazo)naphthalene-3,6-disulfonic acid,
7-phenylamino-1-hydroxy-2-(4'-amino-2'-carboxyphenylazo)naphthalene-3-sulfonic acid,
8-phenylamino-1-hydroxy-2-(4'-amino-2'-sulfophenylazo)naphthalene-3,6-disulfonic acid,
6-ureido-1-hydroxy-2-(5'-amino-2'-sulfophenylazo)-naphthalene-3-sulfonic acid,
6-acetylamino-1-hydroxy-2-(5'-amino-2'-sulfophenylazo)naphthalene-3-sulfonic acid,
8-benzoylamino-1-hydroxy-2-(5'-amino-2'-sulfophenylazo)naphthalene-3,6-disulfonic acid,
1-(4', 8'-disulfonaphtho-2'-yl)-3-methyl-4-(5''-amino-2''-sulfophenylazo)-5-pyrazolone,
1-(2''-sulfophenyl)-3-carboxy-4-(5''-amino-2''-sulfophenylazo)-5-pyrazolone,
1-(2', 5'-dichloro-4'-sulfophenyl)-3-methyl-4-(5''-amino-2''-sulfophenylazo)-5-pyrazolone,
5-(3'-amino-4'-sulfophenylazo)-4-methyl-3-carbonamide-6-hydroxy-N-ethylpyrid-2-one,
5-(4'-amino-3'-sulfophenylazo)-4-methyl-3-cyano-6-hydroxy-N-methylpyrid-2-one,
5-(4'-amino-2', 5'-disulfophenylazo)-4-methyl-3-cyano-6-hydroxy-N-ethylpyrid-2-one,
5-(3'-amino-4'-sulfophenylazo)-3,4-dimethyl-6-hydroxy-1-n-propylpyrid-2-one,
5-(4'-amino-2', 5'-disulfophenylazo)-1-n-butyl-6-hydroxy-4-methyl-3-sulfomethylpyrid-2-one,
5-(3'-amino-4'-sulfophenylazo)-1-ethyl-6-hydroxy-4-methyl-3-sulfopyrid-2-one,
5-(3'-amino-4'-sulfophenylazo)-3-chloro-1-ethyl-6-hydroxy-4-methylpyrid-2-one,
5-(3'-amino-4'-sulfophenylazo)-3-cyano-1-phenyl-6-hydroxy-4-sulfomethylpyrrolid-2-one,
5-(3'-amino-4'-sulfophenylazo)-3-aminocarbonyl-6-hydroxy-4-methyl-1-[2'-(4''-sulfophenyl)-ethyl]pyrid-2-one,
1-hydroxy-2-(1'-sulfo-5'-aminomethylnaphtho-2'-ylazo)-8-benzoylaminonaphthalene-3,6-disulfonic acid,
1-(2', 5'-dichlorophenyl)-3-methyl-4-(1''-sulfo-5''-aminomethylnaphtho-2''-ylazo)-5-pyrazolone,
1-phenyl-3-carboxy-4-(1''-sulfo-5''-aminomethylnaphtho-2''-ylazo)-5-pyrazolone,
1-hydroxy-2-(1'-sulfo-5'-aminomethylnaphtho-2'-ylazo)-8-benzoylaminonaphthalene-3,5-disulfonic acid, 1-hydroxy-2-(1'-sulfo-5'-aminomethylnaphtho-2'-ylazo)-7-(2''-sulfophenylazo)-8-aminonaphthalene-3,6-disulfonic acid, 1-hydroxy-2-(1'-sulfo-5'-aminoethylnaphtho-2'-ylazo)-7-(2'', 5''-disulfophenylazo)-8-aminonaphthalene-3,6-disulfonic acid, 1-hydroxy-2-(1'-sulfo-5'-aminomethylnaphtho-2'-ylazo)-8-acetylaminonaphthalene-3,5-disulfonic acid, 1-hydroxy-2-(4'-aminoacetylphenylazo)-6-acetylaminonaphthalene-3,5-disulfonic acid, 1-hydroxy-2-(2'-sulfo-5'-aminophenylazo)-7-(4''-sulfophenylazo)-8-aminonaphthalene-3,6-disulfonic acid, 5-(5'-aminoethyl-4'-methyl-2'-sulfophenylazo)-1-ethyl-6-hydroxy-4-methyl-3-sulfopyrid-2-one, 1-hydroxy-2-(5'-aminomethyl-4'-methyl-2'-sulfophenylazo)-7-(1'', 5''-disulfonaphtho-2''-ylazo)-8-aminonaphthalene-3,6-disulfonic acid, 1-hydroxy-2-[4'-(4''-aminomethyl-2''-sulfophenylazo)-2'-methoxyphenylazo]naphthalene-3,6,8-trisulfonic acid, 1-(4'-sulfophenyl)-3-carboxy-4-(4''-methylaminoacetylamino-2''-sulfophenylazo)-5-pyrazolone, 1-(3'-methylaminoacetylaminophenyl)-3-carboxy-4-(1'', 5''-disulfonaphtho-2''-ylazo )-5-pyrazolone, 1-hydroxy-2-(1'-sulfo-5'-β-aminoethylsulfamoylnaphtho-2'-ylazo)-8-benzoylamino-3,6-disulfonic acid, and 1-hydroxy-2-(1'-sulfo-5'-β-aminoethylsulfamoylnaphtho-2'-ylazo )-8-acetylamino-3,5-disulfonic acid.

Item (VI):

1-(3'-aminophenyl)-3-methyl-4-(2', 5'-disulfophenylazo)-5-pyrazolone, 1-(3'-aminophenyl)-3-carboxy-4-(2'-carboxyphenylazo)-5-pyrazolone, 1-(3'-aminoacetylaminophenyl)-3-methyl-4-(2'-sulfophenylazo)-5-pyrazolone, 4-amino-4'-[3''-methyl-4''-(2''', 5'''-disulfophenylazo)-1''-pyrazol-5''-onyl]stilbene-2,2'-sulfonic acid, 1-(3'-aminophenyl)-3-carboxy-4-[4''-(2'''-sulfophenylazo)-2''-methoxy-5''-methylphenylazo]-5-pyrazolone, 1-(2'-aminoethyl)-3-(1'', 5''-disulfonaphtho- 2''-ylazo)- 6 -hydroxy-4-methylpyrid-2-one, 1-(2'-aminoethyl)-3,4-dimethyl-5-(1''', 5''-disulfonaphtho-2-ylazo)-6-hydroxypyrid-2-one, 3-aminocarbonyl-1-(2'-aminoethyl)-6-hydroxy-4-methyl-5-(1'', 5''-disulfonaphtho-2''-ylazo)pyrid-2-one, and 1-(2'-aminoethyl)-3-cyano-5-(2''-sulfophenylazo)-6-hydroxy-4-methylpyrid-2-one.

Item (VII):

copper complex of 8-amino-1-hydroxy-2-(2'-hydroxy-5'-sulfophenylazo)naphthalene-3,6-disulfonic acid, copper complex of 6-amino-1-hydroxy-2-(2'-hydroxy-5'-sulfophenylazo)naphthalene-3-sulfonic acid, copper complex of 6-amino-1-hydroxy-2-(2'-hydroxy-5'-sulfophenylazo)naphthalene-3,5-disulfonic acid, copper complex of 8-amino-1,1'-dihydroxy-2,2'-azonaphthalene-3,4', 6,8'-tetrasulfonic acid, copper complex of 8-amino-1-hydroxy-2-[4'-(2''-sulfophenylazo)-2'-methoxy-5'-methylphenylazo]-naphthalene-3,6-disulfonic acid, copper complex of 6-amino-1-hydroxy-2-[4'-(2''-sulfophenylazo)-2'-methoxy-5'-methylphenylazo]-naphthalene-3,5-disulfonic acid, copper complex of 1-(3'-amino-4'-sulfophenyl)- 3-methyl-4-[4''-(2'''-sulfophenylazo)-2''-methoxy-5''-methylphenylazo]-5-pyrazole, copper complex of 7-(4'-amino-3'-sulfanilino)-1-hydroxy-2-[4''-(2''''-sulfophenylazo)-2''-methoxy-5''-methyphenylazo]naphthalene-3-sulfonic acid, copper complex of 4-(4'-amino-3'-sulfanilino)-1-hydroxy-2-(2''-carboxyphenylazo)naphthalene-3-sulfonic acid, copper complex of 1-hydroxy-2-(3'-chloro-5'-sulfo-2'-hydroxyphenylazo)-8-ω-(N-methylamino)-acetylaminonaphthalene-3,6-disulfonic acid, copper complex of 1-hydroxy-2-(3'-sulfo-2'-hydroxyphenylazo)-6-ω-(N-methylamino)acetylaminonaphthalene-3-sulfonic acid, and trisodium salt of copper complex of 1-hydroxy-2-[4'-(2'', 5''-difulfophenylazo)-5'-methyl-2'-hydroxyphenylazo]-6-ω-(N-methylamino)acetylaminonaphthalene-3-sulfonic acid.

Item (VIII):

3-(3'-amino-4'-sulfophenyl)sulfamyl copper phthalocyanine-tri-3-sulfonic acid, 4-(3'-amino-4'-sulfophenyl)sulfamyl copper phthalocyanine-tri-4-sulfonic acid, 3-(3'- or 4'-aminophenyl)sulfamyl copper phthalocyanine-3-sulfonamide-di-3-sulfonic acid, and 3-(2-aminoethyl)sulfamyl copper phthalocyanine-tri-3-sulfonic acid.

Item (IX):

copper complex of N-(2-hydroxy-5-sulfo-3-aminophenyl)-N'-(2'-carboxy-4'-sulfophenyl)-ms-phenyl-formazane, copper complex of N-(2-hydroxy-5-sulfo-3-aminophenyl)-N'-(2'-carboxy-4'-sulfophenyl)-ms-(4''-sulfophenyl)formazane, copper complex of N-(2-hydroxy-5-sulfophenyl)-N-(2'-carboxy-4- aminophenyl)-ms-(2''-sulfophenyl)formazane, copper complex of N-(2-hydroxy-5-sulfophenyl)-N'-(2'-carboxy-4'-aminophenyl)-ms-(2''-chloro-5''-sulfophenyl)formazane, copper complex of N-(2-hydroxy-5-sulfophenyl)-N'-(2'-carboxy-4'-sulfophenyl)-ms-(4-aminophenyl)formazane, copper complex of N-(2-hydroxy-5-sulfophenyl)-N'-(2'-carboxy-4'-sulfophenyl)-ms-(4-aminophenyl)formazane, copper complex of N-(2-hydroxy-5-sulfophenyl)-N'-(2'-carboxy-4'-sulfophenyl)-ms-(4''-amino-2''-sulfophenyl)formazane, copper complex of N-(2-carboxy-4-aminophenyl)-N'-(2'-hydroxy-4'-sulfonaphth-1'-yl)-ms-(2''-sulfophenyl-formazane, and copper complex of N-(2-hydroxy-5-sulfophenyl)-N'-(2'-carboxy-4'-sulfophenyl)-ms-(4'''-aminoacetylaminiophenyl)formazane.

Item (X):

3,10-diamino-6,18-dichlorotriphendioxazine-4,11-disulfonic acid, 3,10-bis(4'-amino-2', 5'-disulfanilino)-6,13-dichlorotriphendioxazine-4,11-disulfonic acid, 3,10-bis(3'-amino-4'-sulfanilino)-6,13-dichlorotriphendioxazine-4,11-disulfonic acid, 3,10-di(2'-aminoethylamino)-6,13-dichlorotriphendioxazine-4,11-disulfonic acid, 3,10-di(3'-aminopropylamino)-6,13-dichlorotriphendioxazine-4,11-disulfonic acid, and 3,10-diamino-6,13-dichlorophendioxazine-2,4,11-trisulfonic acid.

In the formula (5) mentioned above, the typical phenylene and naphthylene groups represented by A are as follows:

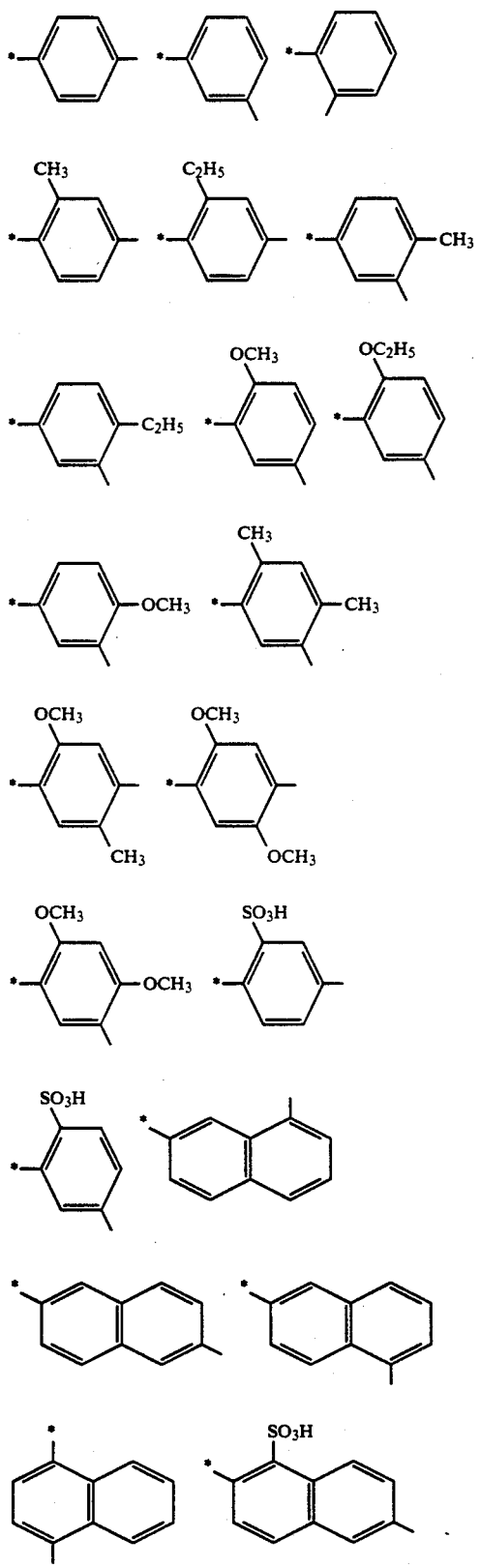

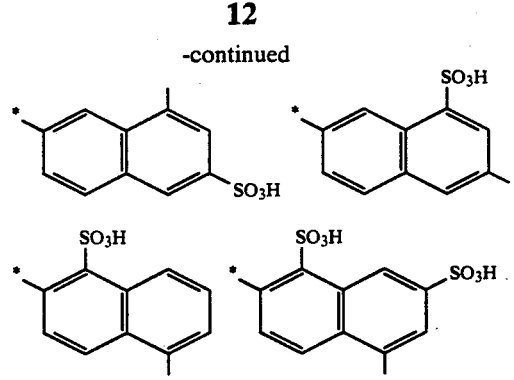

wherein the asterisked linkage bonds to the —NR$_1$— group.

The alkylene and alkyleneoxy represented by A in the formula (5) are those represented by the following formulas, respectively,

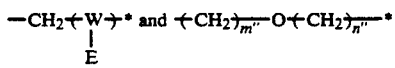

wherein W is straight or branched $C_1$-$C_6$ alkylene, E is hydrogen, chloro, bromo, fluoro, hydroxy, cyano, $C_1$-$C_4$ alkylcarbonyloxy, $C_1$-$C_5$ alkoxycarbonyl, carboxy or carbamoyl, m" and n" are each a number of 1 to 6, and the asterisked linkage is as defined above.

Also, as the alkyl group which may be substituted and is represented by $R_2$ or $R_3$, an alkyl group having 1 to 4 carbon atoms which may be substituted with one or two substituents selected from the group of alkoxy with 1 to 4 carbons, sulfo, carboxy, hydroxy, chloro, phenyl and sulfato, is preferred.

As particularly preferred ones, methyl, ethyl, n-propyl, isopropyl, n-butyl, isobutyl, sec-butyl, $\beta$-hydroxyethyl, $\beta$-sulfatethyl, $\beta$-sulfoethyl, $\beta$-methoxyethyl and $\beta$-carboxyethyl may be mentioned.

Also, as the phenyl group which may be substituted and is represented by $R_2$ or $R_3$, a phenyl group which may be substituted with one or two substituents selected from the group of alkyl with 1 to 4 carbon atoms, alkoxy with 1 to 4 carbon atoms, sulfo, carboxy, chloro and bromo, is preferred.

As particularly preferred ones, phenyl, 2-, 3- or 4-sulfophenyl, 2-, 3- or 4-carboxyphenyl, 2-, 3- or 4-chlorophenyl, 2-, 3- or 4-methylphenyl, and 2-, 3- or 4-methoxyphenyl may be mentioned.

Also, as the naphthyl group which may be substituted and is represented by $R_2$ or $R_3$, a naphthyl group which may be substituted with one, two or three substituents selected from the group of hydroxy, carboxy, sulfo, alkyl with 1 to 4 carbon atoms, alkoxy with 1 to 4 carbon atoms, and chloro, is preferred.

As particularly preferred ones, 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl may be mentioned.

In the present invention, particularly preferred are the cases where any one of $R_2$ and $R_3$ is hydrogen, methyl or ethyl, and the other is a phenyl group which may be substituted with alkyl with 1 to 4 carbon atoms, alkoxy with 1 to 4 carbon atoms, sulfo, carboxy, or halogen.

In case where X is —NR$_2$R$_3$ in the formula (5) mentioned above, compounds represented by the formula HNR$_2$R$_3$ to be used to form such groups may be exemplified as follows: ammonia; 1-aminobenzene, 1-amino-2-, -3- or -4- methylbenzene, 1-amino-3,4- or 3,5-dimethylbenzene, 1-amino-2-, -3- or -4-ethylbenzene, 1-amino-2-, -3- or -4-methoxybenzene, 1-amino-2-, -3- or -4-ethoxybenzene, 1-amino-2-, -3- or -4-chlorobenzene, 3- or 4-aminophenylmethanesulfonic acid, 3-aminobenzenesulfonic acid, 4 - aminobenezenesulfonic acid, 3-methylaminobenzenesulfonic acid, 3-ethylaminobenzenesulfonic acid, 4-methylaminobenzensulfonic acid, 4-ethylaminobenzenesulfonic acid, 5-aminobenzene-1,3-disulfonic acid, 6-aminobenzene-1,4-disulfonic acid, 6-aminobenzene-1,3-disulfonic acid, 4-aminobenzene-1,2-disulfonic acid, 4-amino - 5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or -4-methylbenzene, 1-ethylamino-4-chlorobenzene, 1-ethylamino-3- or -4-methylbenzene, 1-(2-hydroxyethyl)-amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2-sulfonic acid, 6- aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5 - aminonaphthalene-1, 3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid, 4-aminonaphthalene-1,3,7-trisulfonic acid and the like aromatic amines; and methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, δ-aminocaproic acid, benzylamine, 2-, 3- or 4-chlorobenzylamine, 4-methylbenzylamine, N-methylbenzylamine, 2-, 3- or 4-sulfobenzylamine, 2-phenylethylamine, 1-phenylethylamine, 1-phenyl-2-propylamine, and the like aliphatic amines.

As the particularly preferable compounds, there may be illustrated aniline, N-methylaniline, N-ethylaniline, 2-, 3- or 4-chloraniline, N-methyl-2-, -3- or -4-chloraniline, N-ethyl-2-, -3- or -4-chloraniline, 2-, 3- or 4-methylaniline, 2-, 3- or 4-carboxyaniline, 2-, 3- or 4-sulfaniline, 2,4- or 2,5-disulfaniline, 3- or 4-methylaminobenzenesulfonic acid, 3- or 4-ethylaminobenzenesulfonic acid, taurine, N-methyltaurine, mono- or diethanolamine, and the like.

As the alkyl group which may be substituted and is represented by R$_4$, for example, an alkyl group with 1 to 4 carbon atoms, which may be substituted with one or two substituents selected from the group of alkoxyl with 1 to 4 carbon atoms, sulfo, carboxy, hydroxy, chloro, phenyl, cyano and sulfato, is preferred.

As the more preferred ones, there may be illustrated methyl, ethyl, n-propyl, isopropyl, n-butyl, isobutyl, sec-butyl, β-hydroxyethyl, β-sulfatoethyl, β-sulfoethyl, etc.

As the furthermore preferred ones, there may be illustrated 2-, 3-, 4-, 5-, 6-, 7- or 8-sulfo-1-naphthyl, 1-, 5-, 6-, 7 or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl, etc.

As the benzyl group which may be substituted and is represented by R$_4$, for example, a benzyl group which may be substituted with one or two substituents selected from the group of alkyl with 1 to 4 carbon atoms, alkoxy with 1 to 4 carbon atoms, sulfo and chloro, is preferred. Particularly, benzyl, and 2-, 3- or 4 - sulfobenzyl are preferred.

In case where X is OR$_4$ in the formula (5) mentioned above, the compounds represented by the formula R$_4$OH which are used to form such a group may be exemplified as follows: phenol, 1-hydroxy-2-, -3- or -4-methylbenzene, 1-hydroxy-3,4-or 3,5-dimethylbenzene, 1-hydroxy-2-, -3- or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or 4-hydroxyphenylmethanesulfonic acid, 3-hydroxybenzenesulfonic acid, 4-hydroxybenzenesulfonic acid, 5-hydroxybenzene-1,3-disulfonic acid, 6-hydroxybenzene-1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, 5-hydroxy-2-ethoxybenzenesulfonic acid, 2-hydroxynaphthalene-1-sulfonic acid, 4-hydroxynaphthalene-1-sulfonic acid, 5-hydroxynaphthalene-1-sulfonic acid, 6-hydroxynaphthalene-1-sulfonic acid, 7-hydroxynaphthalene-1-sulfonic acid, 8-hydroxynaphthalene-1-sulfonic acid, 1-hydroxynaphthalene- 2-sulfonic acid, 4-hydroxynaphthalene-2-sulfonic acid, 5-hydroxynaphthalene-2-sulfonic acid, 6-hydroxynaphthalene-2-sulfonic acid, 7-hydroxynaphthalene-2-sulfonic acid, 8-hydroxynaphthalene-2-sulfonic acid, 4-hydroxynaphthalene-1,3-disulfonic acid, 5-hydroxynaphthalene-1,3-disulfonic acid, 6-hydroxynaphthalene-1,3-disulfonic acid, 7-hydroxynaphthalene-1,3-disulfonic acid, 8-hydroxynaphthalene-1,3-disulfonic acid, 2-hydroxynaphthalene-1,5-disulfonic acid, 3-hydroxynaphthalene-1,5-disulfonic acid, 4-hydroxynaphthalene-1,5-disulfonic acid, 4-hydroxynaphthalene-1,6-disulfonic acid, 8-hydroxynaphthalene-1,6-disulfonic acid, 4-hydroxynaphthalene-1,7-disulfonic acid, 3-hydroxynaphthalene-2,6-disulfonic acid, 4-hydroxynaphthalene-2,6-disulfonic acid, 3-hydroxynaphthalene-2,7-disulfonic acid, 4-hydroxynaphthalene-2,7-disulfonic acid, 6-hydroxynaphthalene-1,3,5-trisulfonic acid, 7-hydroxynaphthalene-1,3,5-trisulfonic acid, 4-hydroxynaphthalene-1,3,6-trisulfonic acid, 7-aminonaphthalene-1,3,6-trisulfonic acid, 8-aminonaphthalene-1,3,6-trisulfonic acid, 4-aminonaphthalene-1,3,7-trisulfonic acid, and the like aromatic compounds; methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, 2-sulfatoetaanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethanol, 1-phenyl-2-propanol, and the like aliphatic compounds.

Specific embodiments of the dyes represented by the formula (5) containing a triazinyl group are illustrated below.

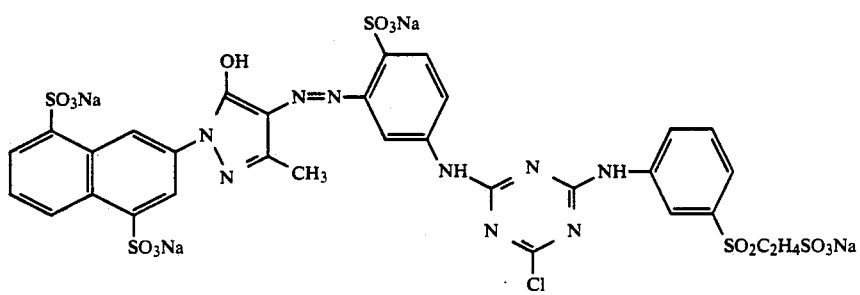

(17)

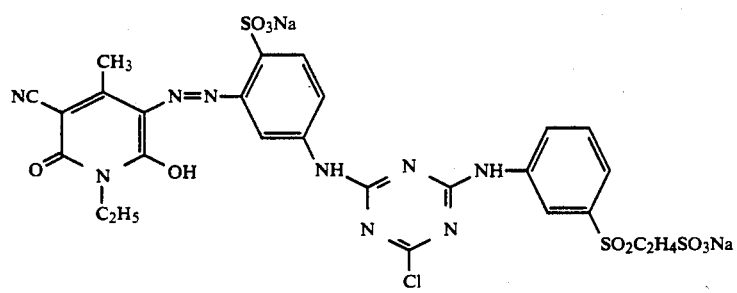

(18)

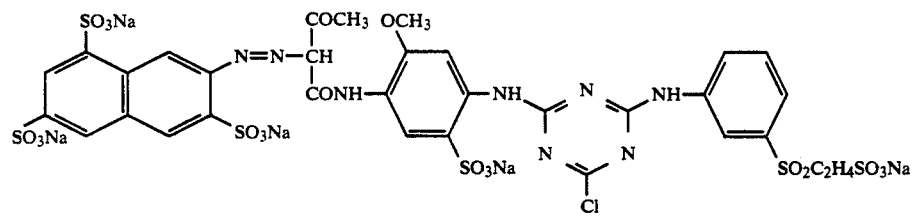

(19)

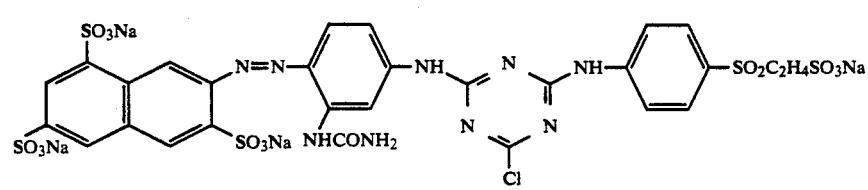

(20)

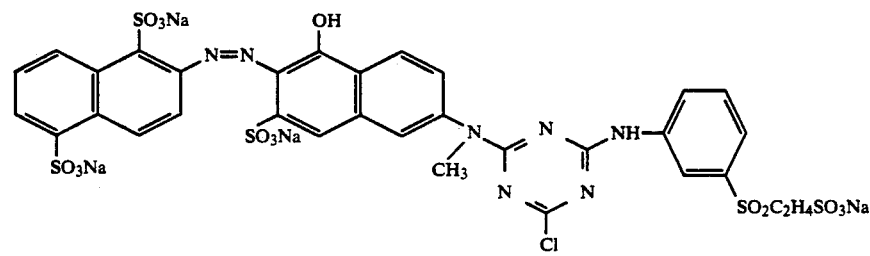

(21)

-continued
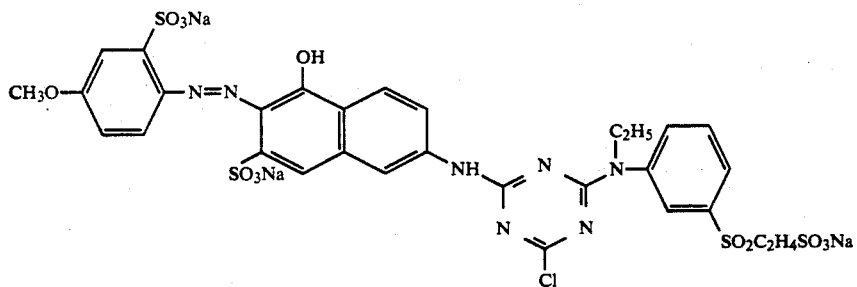
(22)
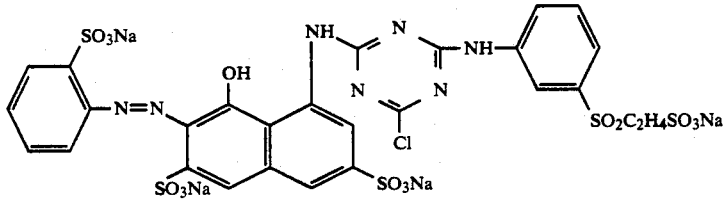
(23)
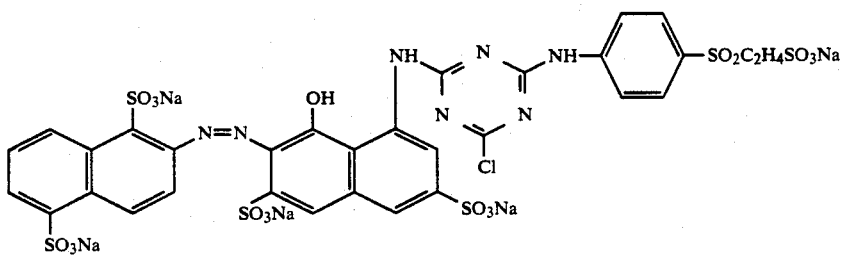
(24)
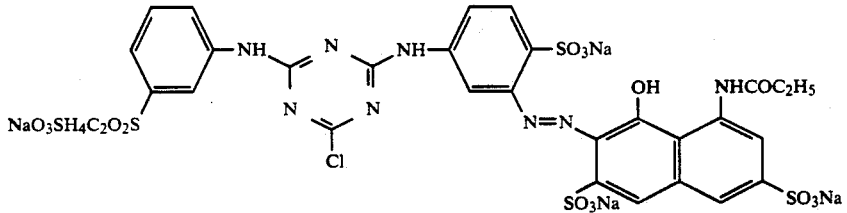
(25)
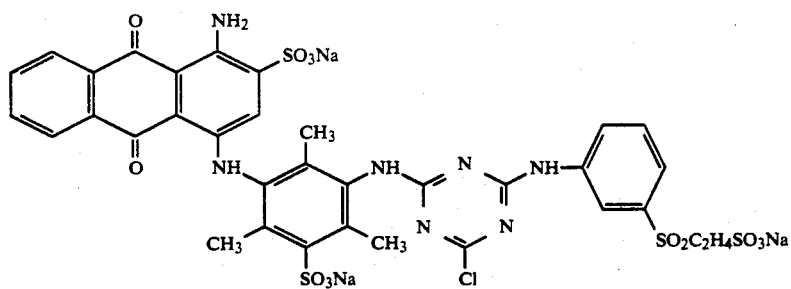
(26)
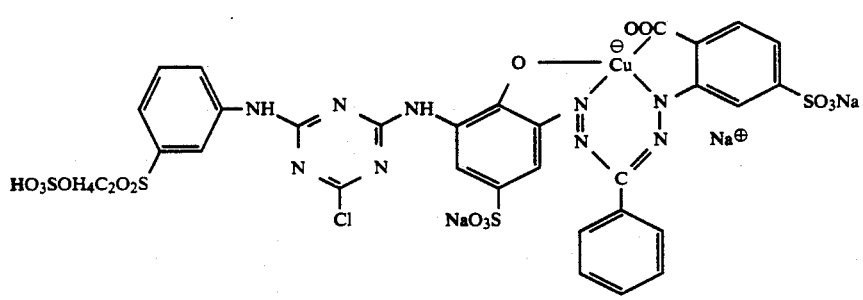
(27)

-continued
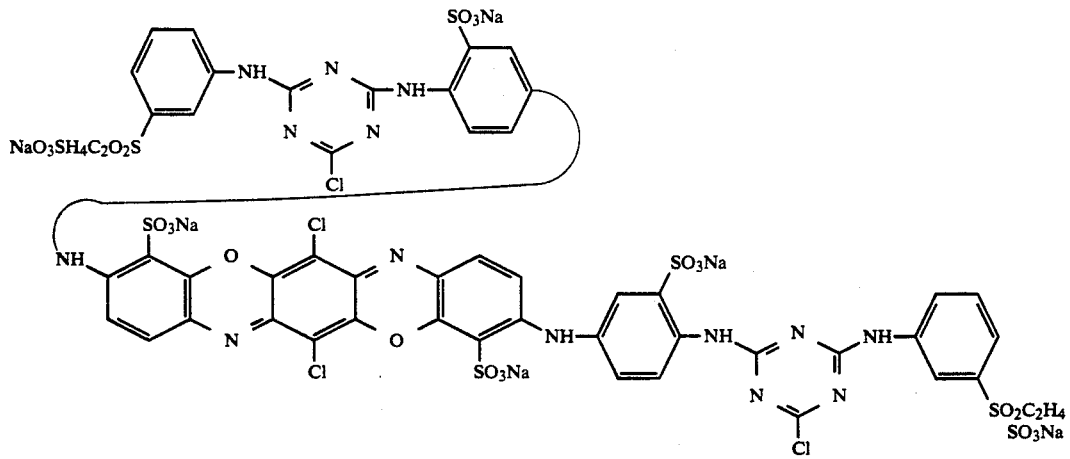
(28)
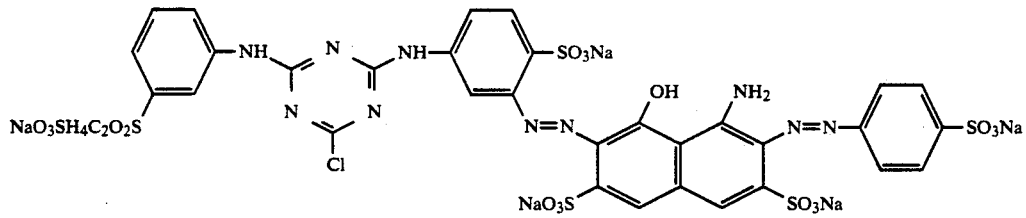
(29)
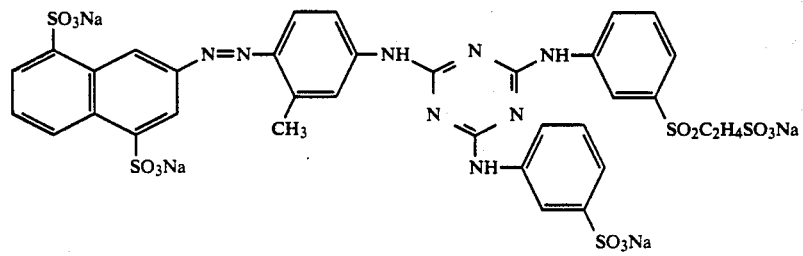
(30)
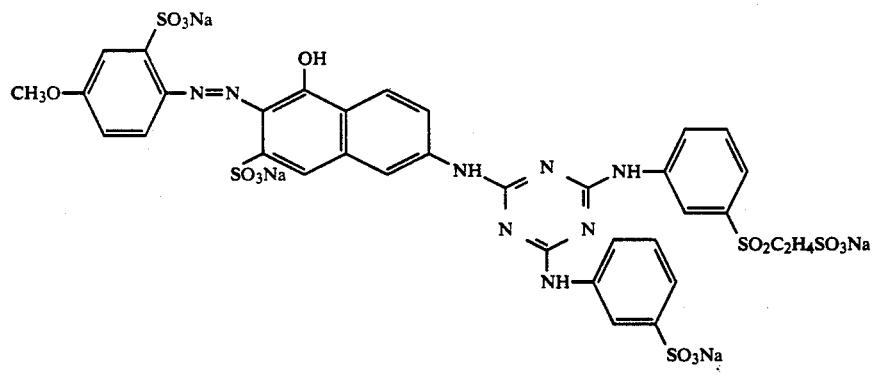
(31)
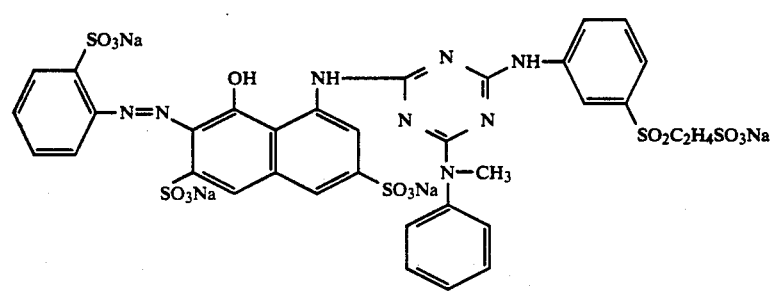
(32)

-continued

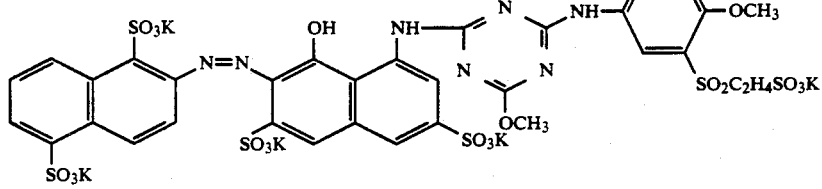
(33)

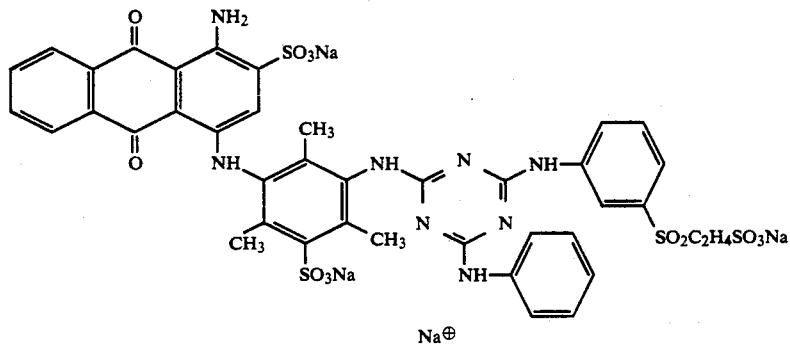
(34)

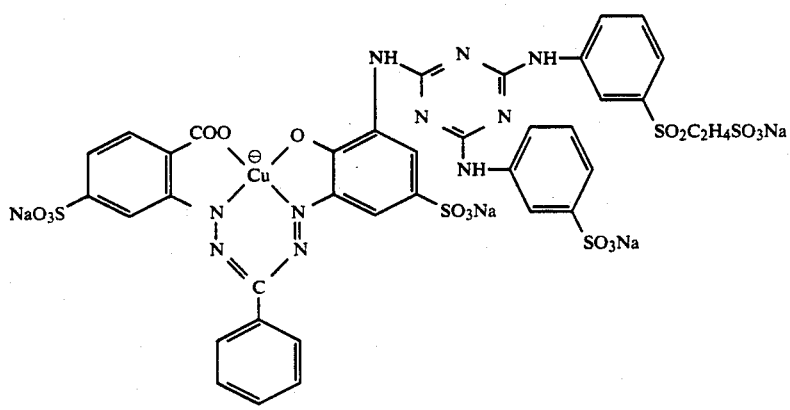
(35)

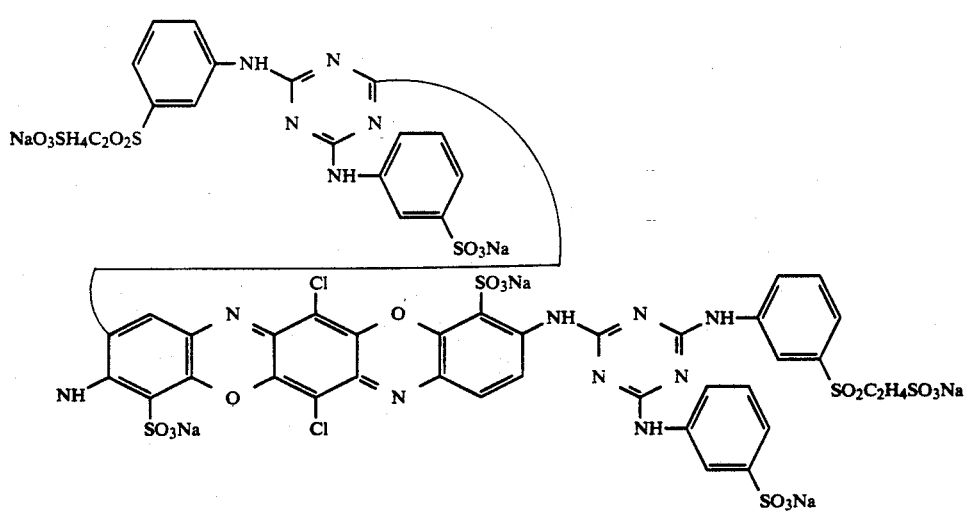
(36)

As the organic solvent to be employed for the ink jet recording ink composition of the present invention, any of those having been conventionally used may be chosen. Typically, multivalent alcohols, cellosolves, carbitols, etc., specifically, ethylene glycol, diethylene glycol, triethylene glycol, tetraethylene glycol, propylene glycol, glycerol, polyethylene glycol, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and the like are exemplified.

Dimethylformamide, N-methyl-2-pyrrolidone, other alcohols, alkanolamines and the like may also be used. Of course, they may be used singly or as a mixture thereof.

In the preparation of the present ink composition, the disazo compound of the formula (I), the water soluble solvent and water are used preferably in the amount of 0.5 to 20 parts by weight, more preferably 1 to 15 parts by weight, 1 to 60 parts by weight, and 20 to 90 parts by weight, respectively, based on 100 parts by weight of the ink composition. With less than 0.5 part by weight of the disazo compound, coloration is insufficient, and with more than 20 parts by weight thereof, precipitate may occur after a long period of time.

The ink composition of the present invention may contain other dye compounds conventionally used for the ink composition, to the extent that the characteristics of the present composition are not deteriorated.

In order to provide more excellent characteristics, various kinds of additives conventionally used may be used for the ink composition of the present invention. The additives include, for example, antiseptics or fungicides such as sodium dehydroacetate, dicyclohexylammonium nitrite and the like, ultraviolet ray absorbers, viscosity adjusters, surface tension adjusters, pH adjusters, specific resistivity adjusters, infrared absorbers, penetrants and the like.

The ink composition of the present invention can be prepared by dissolving the disazo compound of the formula (40) and the water soluble organic solvent in water, if desired, together with various additives as mentioned above, preferably at an elevated temperature, and passing the solution before or after cooling through a filtering membrane having holes of a fine diameter to separate undissolved matters.

The water-based ink composition thus obtained in accordance with the present invention is useful for the ink jet recording, has a desirable tint as a red color and can meet various needs such as stability during storage or use, heat resistance, image clearness, water resistance, light fastness and the like.

The present invention is explained in more detail with reference to the following Examples, which are only illustrative but not limitative.

SYNTHETIC EXAMPLE—1

In 100 ml of water was dissolved 10 g of a dye (C. I. Reactive Black 5) represented by the formula (A):

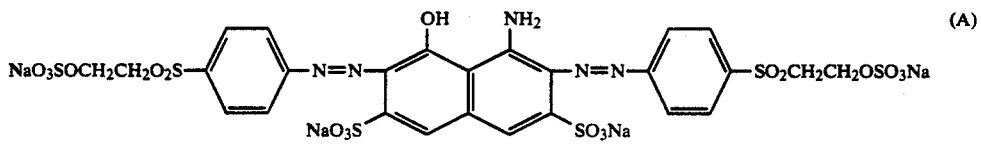

After adding 4 g of sodium sulfite thereto, the mixture was heated to 60° C., and then 5 g of sodium bicarbonate was added thereto. The mixture was kept at a temperature of 60° to 65° C. under stirring for 3 hours to make the reaction proceed.

Then, the mixture was cooled to 30° to 35° C., and the salt was removed using a reverse osmotic membrane. The solution was subjected to hot wind drying to obtain 9 g of a black powdered dye represented by the formula (B):

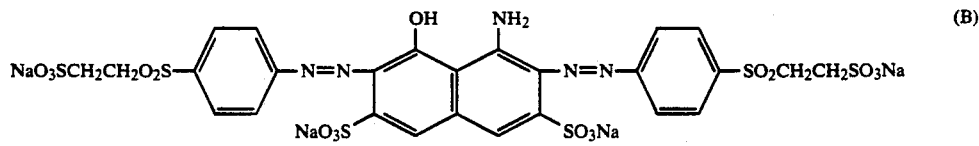

which was identified by elementary analysis, NMR, mass spectrum, etc.

SYNTHETIC EXAMPLE—2

In 100 ml of water was dissolved 6 g of a dye (C. I. Reactive Blue 19) represented by the formula (C):

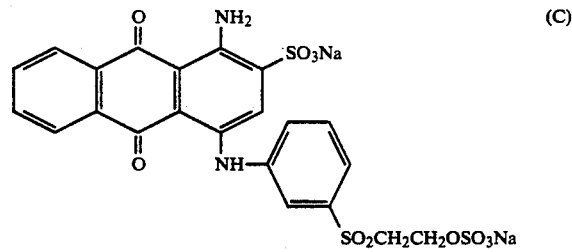

After adding 2 g of potassium sulfite thereto at 60° C., the mixture was kept at a temperature of 60° to 65° C. under stirring for 3 hours to make the reaction proceed.

Then, the mixture was cooled to 30° to 35° C., and the salt was removed using a reverse osmotic membrane. The solution was subjected to hot wind drying to obtain 5 g of a blue powdered dye represented by the formula (D):

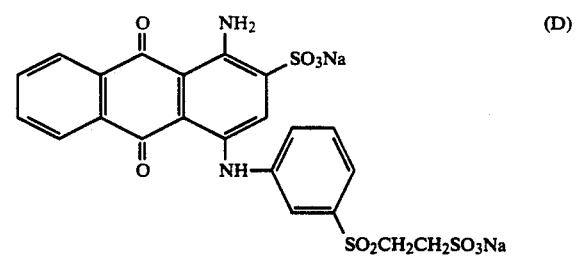

which was identified by elementary analysis, NMR, mass spectrum, etc.

SYNTHETIC EXAMPLES—3 to 5

Using reactive dye as shown in the following Table1, the respective objective dyes were obtained in the similar way as in Synthetic example-2.

TABLE 1

| Synthetic example-3 | C.I. Reactive Blue 27 |
|---|---|
| Synthetic example-4 | C.I. Reactive Blue 147 |
| Synthetic example-5 | C.I. Reactive Blue 21 |

SYNTHETIC EXAMPLES—6 and—7

Using C. I. Reactive Yellow 15 and C. I. Reactive Yellow 23, dyes represented by the formula (E) and (F), respectively:

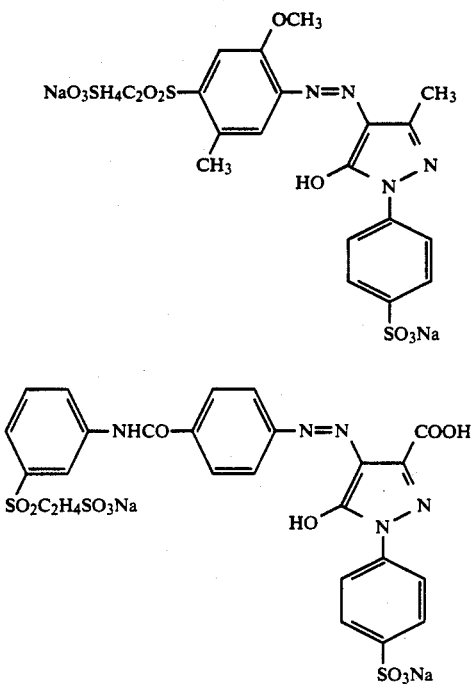

were obtained in the similar way as in Synthetic example-1.

SYNTHETIC EXAMPLES—8 to 12

Using reactive dyes as shown in the following Table 2, the respective objective dyes were obtained in the similar way as in Synthetic example-1.

TABLE 2

| Synthetic example-8 | C.I. Reactive Yellow 17 |
|---|---|
| Synthetic example-9 | C.I. Reactive Yellow 37 |
| Synthetic example-10 | C.I. Reactive Yellow 76 |
| Synthetic example-11 | C.I. Reactive Yellow 77 |
| Synthetic example-12 | C.I. Reactive Yellow 115 |

SYNTHETIC EXAMPLE—13

Using C. I. Reactive Orange 16, the dye represented by the formula (G):

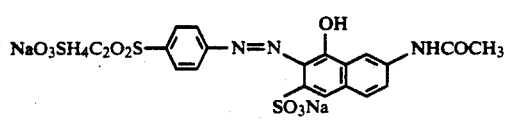

was obtained in the similar way as in Synthetic example-1.

SYNTHETIC EXAMPLES—14 to 16

Using reactive dyes shown in the following Table 3, the respective objective dyes were obtained in the similar way as in Synthetic example-1.

TABLE 3

| Synthetic example-14 | C.I. Reactive Orange 7 |
|---|---|
| Synthetic example-15 | C.I. Reactive Orange 56 |
| Synthetic example-16 | C.I. Reactive Orange 72 |

SYNTHETIC EXAMPLES—17 and 18

Using C. I. Reactive Red 21 and C. I. Reactive Red 22, the dyes represented by the formula (H) and (I), respectively:

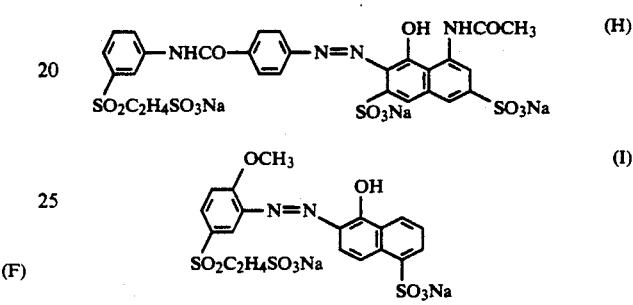

were obtained in the similar way as in Synthetic example-1.

SYNTHETIC EXAMPLES—16 to 22

Using reactive dyes shown in the following Table 4, the respective objective dyes were obtained in the similar way as in Synthetic example-1.

TABLE 4

| Synthetic example-16 | C.I. Reactive Red 109 |
|---|---|
| Synthetic example-17 | C.I. Reactive Red 111 |
| Synthetic example 18 | C.I. Reactive Red 112 |
| Synthetic example 19 | C.I. Reactive Red 113 |
| Synthetic example-20 | C.I. Reactive Red 114 |
| Synthetic example-21 | C.I. Reactive Violet 22 |
| Synthetic example-22 | C.I. Reactive Brown 21 |

SYNTHETIC EXAMPLE—23

In 100 ml of water was dissolved 9.3 g of sodium salt of the compound represented by the formula (J):

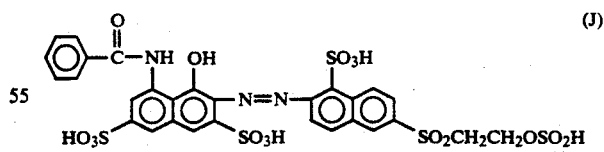

After adding 2 g of sodium sulfite, the solution was heated to 60° C. and 5 g of sodium bicarbonate was added. The mixture was kept at a temperature of 60° to 65° C. under stirring for 3 hours to make the reaction proceed.

Then, the mixture was cooled to 30° to 35° C., and the salt was removed using a reverse osmotic membrane. The solution was subjected to hot wind drying to obtain 9 g of the sodium salt (red powder) of the compound represented by the formula (K):

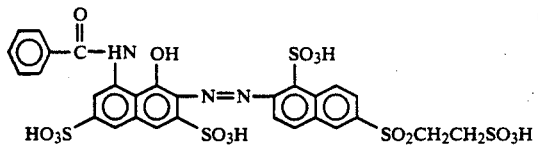
(K)

The dye had a λmax of 549 nm. The elementary analyses of the pure specimen are as follows.

|  | C | H | N | S | Na |
|---|---|---|---|---|---|
| Theoretical (%) | 37.95 | 2.07 | 4.58 | 17.45 | 10.03 |
| Found (%) | 37.9 | 2.0 | 4.5 | 17.4 | 10.1 |

SYNTHETIC EXAMPLE—24

Using 10 g of potassium salt (in place of 9.3 g of sodium salt) of the compound represented by the above formula (K), with otherwise the similar conditions to those in Synthetic example-23, 9.8 g of the potassium salt (red powder) of the compound represented by the above formula (J) was obtained.

The dye had a λmax of 549 nm. The elementary analyses of the pure specimen are as follows.

|  | C | H | N | S | K |
|---|---|---|---|---|---|
| Theoretical (%) | 34.90 | 1.91 | 4.21 | 16.05 | 15.65 |
| Found (%) | 34.8 | 1.8 | 4.2 | 15.9 | 15.6 |

Using the dyes obtained in these Synthetic examples, the composition blends as shown in the following Examples were prepared. Then, ink compositions were prepared by heating each blend to a temperature of approximately 50° C. under stirring to make a solution, and passing the solution through a Teflon filter having 0.22 μm hole diameter. The ink composition had a pH of 8 to 10, a viscosity of 1.5 to 2.5 (cps), and a surface tension of 35 to 60 (dyne/cm).

SYNTHESIS EXAMPLE—25

Using dye represented by the formula

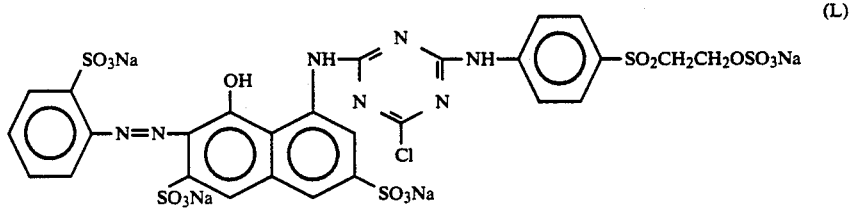
(L)

with otherwise the similar conditions to those in Synthetic example 2, the following dye represented by the formula (M) was obtained.

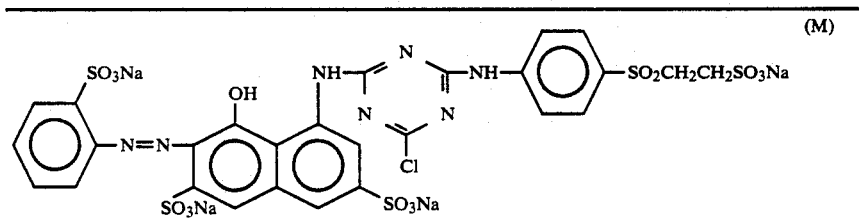
(M)

| Example-1 | |
|---|---|
| Dye of Synthetic example-1 | 2.8% |
| Diethylene glycol | 12.0% |
| Sodium dehydroacetate | 0.1% |
| Ion exchanged water | 85.1% |
| Example-2 | |
| Dye of Synthetic example-2 | 2.5% |
| Glycerol | 8.0% |
| Diethylene glycol | 5.0% |
| Sodium dehydroacetate | 0.1% |
| Ion exchanged water | 84.4% |
| Example-3 | |
| Dye of Synthetic example-1 | 2.5% |
| Diethylene glycol | 10.0% |
| Glycerol | 3.0% |
| Sodium dehydroacetate | 0.1% |
| Ion exchanged water | 84.4% |
| Example-4 | |
| Dye of Synthetic example-25 | 3.0% |
| Diethylene glycol | 3.0% |
| Polyethylene glycol #200 | 8.0% |
| Sodium dehydroacetate | 0.1% |
| Ion exchanged water | 85.9% |
| Example-5 | |
| Dye of Synthetic example-6 | 3.0% |
| Polyethylene glycol #200 | 8.0% |
| Diethylene glycol | 3.0% |
| Sodium dehydroacetate | 0.1% |
| Ion exchanged water | 85.9% |

-continued

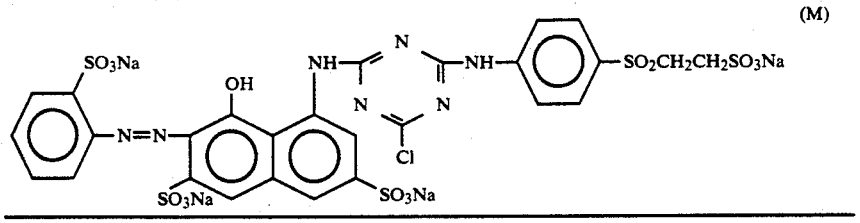

| Example-6 | |
|---|---|
| Dye of Synthetic example-17 | 2.0% |
| Triethylene glycol | 5.5% |
| Polyethylene glycol #200 | 5.0% |
| Sodium dehydroacetate | 0.1% |
| Ion exchanged water | 87.4% |
| Example-7 | |
| Dye of Synthetic example-20 | 2.0% |
| Triethylene glycol | 5.5% |
| Polyethylene glycol #200 | 5.0% |
| Sodium dehydroacetate | 0.1% |
| Ion exchanged water | 87.4% |
| Example-8 | |
| Dye of Synthetic example-42 | 3% |
| Polyethylene glycol #200 | 8% |
| Diethylene glycol | 2% |
| Sodium dehydroacetate | 0.1% |
| Ion exchanged water | 86.9% |

For the comparison, ink compositions prepared in the similar way as in the above Examples but using known dyes for ink compositions, are set forth as follows.

| Comparative example-1 | |
|---|---|
| Dye (C.I. Direct Black 154) | 2.8% |
| Diethylene glycol | 12.0% |
| Sodium dehydroacetate | 0.1% |
| Ion exchanged water | 85.1% |
| Comparative example-2 | |
| Dye (C.I. Reactive Red 180) | 2.0% |
| Diethylene glycol | 8.0% |
| Polyethylene glycol #200 | 3.5% |
| Sodium dehydroacetate | 0.1% |
| Ion exchanged water | 86.4% |
| Comparative example-3 | |
| Dye (C.I. Direct Blue 86) | 2.0% |
| Polyethylene glycol #200 | 3.0% |
| Diethylene glycol | 8.0% |
| Sodium dehydroacetate | 0.1% |
| Ion exchanged water | 86.9% |

Using these ink compositions, evaluation tests were carried out on the following six items, with the results set forth in Table 5.

(1) Image clearness

Using a printer (Sharp Corporation IO 720), ink jet recording was put on a paper of fine quality, and the images were estimated with the eye according to the following criteria:

| clear image with no stain | ⊚ |
|---|---|
| faint stains recognized | ○ |
| somewhat unclear | △ |
| unclear with much blurs and stains | x |

(2) Conservation

The ink was conserved in a sealed glass vessel at 20° C. for six months or at 70° C. for two weeks:

| normal | ○ |
|---|---|
| precipitates recognized | △ |

(3) Jet stability

The jet recording mentioned in the above Item (1) was continued for 500 hours, and the clogging of nozzle and the change of jet direction were observed:

| normal | ⊚ |
|---|---|
| somewhat abnormal after 350 to 500 hours | ○ |
| abnormal after 200 to 350 hours | △ |
| abnormal after less than 200 hours | x |

(4) Jet response

After the jet recording as in the Item (1), the printer was stood at normal temperature under normal humidity for one month or at 40° C. under 30% RH*for a week, thereafter the jet recording as in the Item (1) was resumed: (* relative humidity)

| clear images with no stain | ⊚ |
|---|---|
| slight stains recognized | ○ |
| somewhat unclear | △ |
| unclear with much blurs and stains | x |

(5) Light fastness

After the jet recording as in the Item (1), the recorded paper was irradiated using a fadeometer for 20 hours, and the recorded color was measured using a Macbeth color density meter:

| less than 20% fading | ○ |
|---|---|
| not less than 20% fading | x |

(6) Anti-discoloration

After the jet recording as in the Item (1), the recorded paper was stood in a room for one month, thereafter, the change of color tint was measured:

TABLE 5

| No. | Image clearness | Conservation 20° C. | Conservation 70° C. | Jet stability | Jet response | Light fastness | Anti-discoloration |
|---|---|---|---|---|---|---|---|
| Ex-1 | ⊚ | ○ | ○ | ⊚ | ⊚ | ○ | ○ |
| Ex-2 | ⊚ | ○ | ○ | ⊚ | ⊚ | ○ | ○ |
| Ex-3 | ⊚ | ○ | ○ | ⊚ | ⊚ | ○ | ○ |
| Ex-4 | ⊚ | ○ | ○ | ⊚ | ⊚ | ○ | ○ |
| Ex-5 | ⊚ | ○ | ○ | ⊚ | ⊚ | ○ | ○ |
| Ex-6 | ⊚ | ○ | ○ | ⊚ | ⊚ | ○ | ○ |
| Ex-7 | ⊚ | ○ | ○ | ○ | ○ | ○ | ○ |
| Ex-8 | ⊚ | ○ | ○ | ○ | ○ | ○ | ○ |
| Comp-1 | Δ | ○ | Δ | x | x | ○ | x |
| Comp-2 | ⊚ | ○ | Δ | Δ | Δ | ○ | ○ |
| Comp-3 | ○ | ○ | Δ | x | Δ | ○ | ○ | no change ○
change x

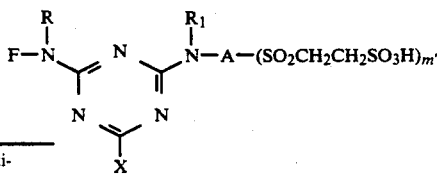

As obvious from the results shown in Table 5, the ink jet recording ink compositions of the present invention are superior in the ink characteristics for ink jet recording to inks using heretofore known dyes.

What is claimed is:

1. An ink composition for ink jet recording comprising a water-soluble dye, an organic solvent and water, wherein said dye is a compound represented by the formula (1):

$$D-(SO_2CH_2CH_2SO_3H)_m \qquad (1)$$

wherein D represents a dye residue selected from the group consisting of monoazo and polyazo dyes, their complexes with Cr, Fe, Co and Cu, copper and nickel phthalocyanine dyes, anthraquinone dyes, dioxazine dyes, and formazane complex dyes, and m represents an integer of 1, 2, 3 or 4, or a salt thereof.

2. The composition according to claim 1, wherein the dye is one prepared by treating a reactive dye represented by the formula (2) or (3) in the free acid form, $$D-(SO_2CH_2CH_2OSO_3H)_m \qquad (2)$$

$$D-(SO_2CH=CH_2)_m \qquad (3)$$

wherein D and m are as defined in claim 1, with a sulfite salt.

3. The composition according to claim 2, wherein the reactive dye is selected from the group consisting of C. I. Reactive Yellow 13, 14, 15, 16, 17, 23, 24. 37, 42, 75, 76, 77, 79, 114, 115 and 116; C. I. Reactive Orange 7, 15, 16, 23, 24, 56, 72 and 113; C. I. Reactive Red 21, 22, 23, 34, 35, 36, 49, 50, 63, 64, 106, 108, 109, 110, 111, 112, 113, 114, 129 and 180; C. I. Reactive Violet 22; C. I. Reactive Brown 21; C. I. Reactive Blue 19, 20, 21, 27, 28, 37, 38, 77, 100, 101, 123, 147 and 148; C. I. Reactive Black 5 and 14.

4. The composition according to claim 1, wherein said dye is a compound represented by the following formula:

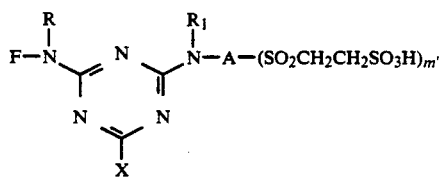

wherein F represents a dye residue selected from the group consisting of monoazo and polyazo dyes, their complexes with Cr, Fe, Co and Cu, copper and nickel phthalocyanine dyes, anthraquinone dyes, dioxazine dyes and formazane complex dyes; R and $R_1$ independently represent a hydrogen atom, a methyl group or an ethyl group; A represents an alkylene group, an alkyleneoxy group, or a phenylene or naphthylene group which may be substituted with a lower alkyl, lower alkoxy or sulfonic acid group; X represents a chlorine atom, a fluorine atom, a $-NR_2R_3$ group, or a $-OR_4$ group; $R_2$, $R_3$ and $R_4$ independently represent a hydrogen atom or a phenyl or naphthyl group which may be substituted; and m' represents an integer of 1 or 2, or a salt thereof.

5. A water-soluble dye represented by the formula (5):

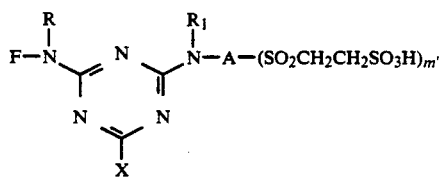

wherein F represents a dye residue selected from the group consisting of monoazo and polyazo dyes, their complexes with Cr, Fe, Co and Cu, copper and nickel phthalocyanine dyes, anthraquinone dyes, dioxazine dyes and formazane complex dyes; R and $R_1$ independently represent a hydrogen atom, a methyl group or an ethyl group; A represents a lower alkylene group, a lower alkyleneoxy group, or a phenylene or naphthylene group which may be substituted with a lower alkyl, lower alkoxy or sulfonic acid group; X represents a chlorine atom, a fluorine atom, a $-NR_2R_3$ group or a $-OR_4$ group; $R_2$, $R_3$ and $R_4$ independently represent a hydrogen atom or a phenyl or naphthyl group which may be substituted; and m' represents an integer of 1 or 2, or a salt thereof.

6. An ink composition for ink jet recording comprising a water-soluble dye, an organic solvent and water, wherein said dye is an azo compound represented by the formula:
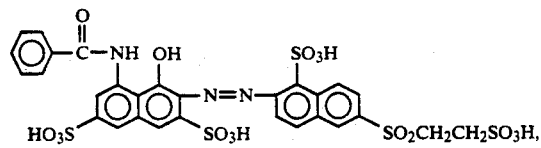
or a salt thereof.
7. An azo dye represented by the formula:
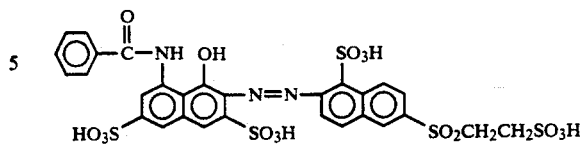
or a salt thereof.
* * * * *